June 24, 1958 — I. MOCKRIN ET AL — 2,840,481
POTASSIUM-FLUORINE GLASSES
Filed Feb. 27, 1952 — 5 Sheets-Sheet 1

INVENTOR.
Isodore Mockrin + William J. Knapp
BY Harold L. Warner

June 24, 1958  I. MOCKRIN ET AL  2,840,481
POTASSIUM-FLUORINE GLASSES
Filed Feb. 27, 1952

RELATION OF $Al_2O_3$, $SiO_2$, AND $B_2O_3$ CONTENT TO FLUORINE IN GLASS COMPOSITION CONTAINING FLUORINE, $K_2O$, $SiO_2$ AND AT LEAST ONE OF THE OXIDES $Al_2O_3$ AND $B_2O_3$ IN WHICH THE FLUORINE IS PRESENT IN AMOUNTS OF 14 TO 32 WEIGHT PERCENT, THE $K_2O$ IS PRESENT IN AMOUNTS OF 12 TO 26 WEIGHT PERCENT, AND THE FLUORINE TO $K_2O$ RATIO IS IN THE RANGE OF 1.0 TO 1.4.

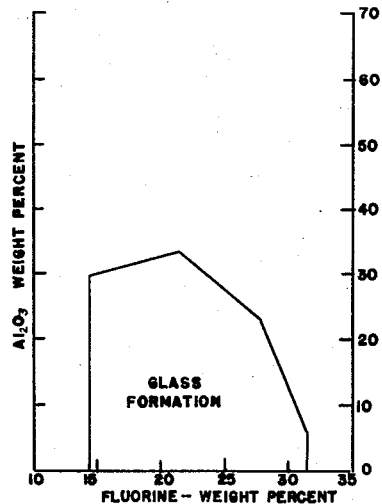

FIG. 4A.

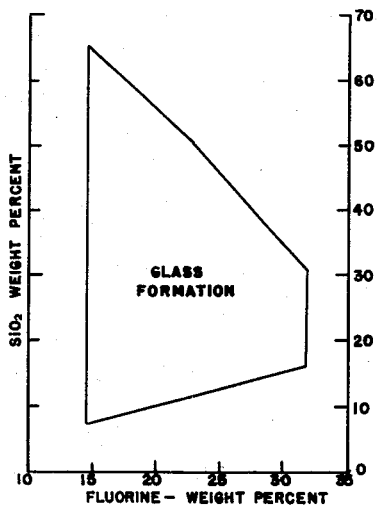

FIG. 4B.

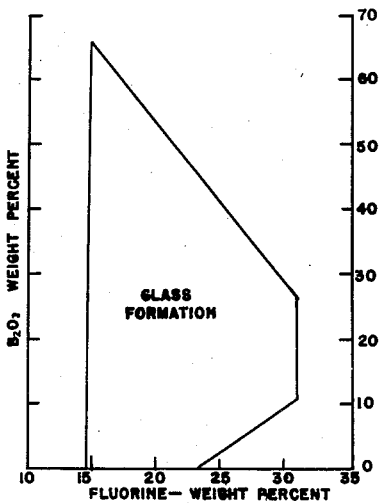

FIG. 4C.

INVENTORS.
ISADORE MOCKRIN
WILLIAM S. KNAPP
BY
ATTORNEY

June 24, 1958     I. MOCKRIN ET AL     2,840,481
POTASSIUM-FLUORINE GLASSES
Filed Feb. 27, 1952     5 Sheets-Sheet 5

RELATION OF $Al_2O_3$, $SiO_2$ AND $B_2O_3$ CONTENT TO FLUORINE IN PREFERRED GLASS COMPOSITIONS CONTAINING FLUORINE, $K_2O$, $SiO_2$, $Al_2O_3$ AND $B_2O_3$ IN WHICH THE FLUORINE IS PRESENT IN AMOUNTS OF 21 TO 28 WEIGHT PERCENT, THE $K_2O$ IS PRESENT IN AMOUNTS OF 17 TO 23 WEIGHT PERCENT, AND THE FLUORINE TO $K_2O$ RATIO IS WITHIN THE RANGE OF 1.0 TO 1.4.

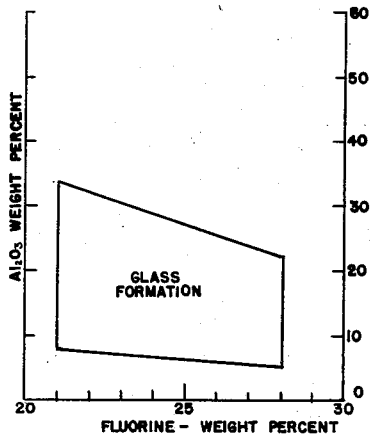

FIG. 5A.

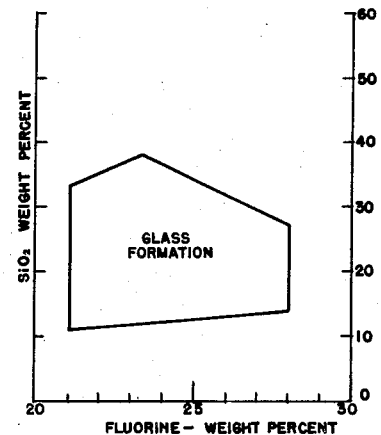

FIG. 5B.

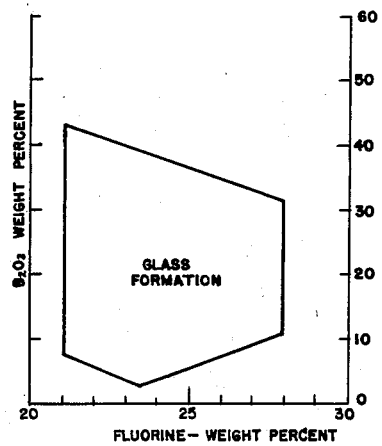

FIG. 5C.

INVENTORS.
ISADORE MOCKRIN
WILLIAM S. KNAPP

BY
    ATTORNEY

United States Patent Office 2,840,481
Patented June 24, 1958

2,840,481

POTASSIUM-FLUORINE GLASSES

Isador Mockrin, Philadelphia, Pa., and William J. Knapp, Los Angeles, Calif., assignors to Pennsalt Chemicals Corporation, a corporation of Pennsylvania Application February 27, 1952, Serial No. 273,671

7 Claims. (Cl. 106—48)

This invention relates to novel potassium-fluorine glasses and methods of making the same and to improved enamel compositions suitable for forming protective and decorative coatings on aluminum and aluminum base metals.

Aluminum and aluminum base metals are being employed in ever increasing variety for a great many purposes. Moreover, the volume of production of these materials has been so increased that their price has been reduced sufficiently so that they now offer considerable competition to steel and other iron materials generally used in building construction for the manufacture of panels, decorative trims, etc., or for the making of various articles of manufacture where lightness combined with strength and durability is desired.

However, aluminum is a relatively soft metal, particularly as compared with iron or steel. As a result, any unprotected aluminum surface is easily marred by scratching or impact with other objects. Also, there is tendency for the aluminum surface to become pitted when exposed to the atmosphere for extended periods of time. This is particularly true if the surface is subjected to periodic cleaning. Further, the softness of the aluminum permits the relatively easy removal of the natural protective oxide layer which forms on the aluminum surface with the result that the relatively chemically active aluminum is exposed and the surface thus further marred. This is particularly undesirable when the metals are used for panelling or decorative purposes in places where they are subject to periodic cleaning with materials which contain mild abrasives.

In order to overcome these objectionable features of aluminum and aluminum base alloys attempts have been made to form protective enamel coatings thereon similar to those used on iron and steel. Besides protecting the aluminum or aluminum base metal, an enameled surface has an added advantage from the decorative point of view in that it can be attractively colored through the addition of coloring agents.

Vitreous enamels of the type commonly used with other metals, particularly with iron or steel, are unsatisfactory for the enameling of aluminum surfaces since their fusion temperatures are too high to enable them to be used satisfactorily with a metal having as low a melting point as aluminum. Of the various vitreous enamel compositions which have heretofore been tried for enameling aluminum and aluminum base metals, we are aware of only one class of enamels which is reputed to have a sufficiently low fusion temperature, sufficient adherence to aluminum and aluminum base metals and sufficient resistance to chemical action to be used for forming protective coatings on these metals. However, this class of enamels contains as one of its principal ingredients over 25% lead oxide, which has long been known to possess toxic properties. In some of the formulations the lead oxide content is as high as 60% by weight. In addition to its being objectionable because of its toxic properties, lead oxide is relatively expensive and due to its large density, for a given enamel thickness, a considerably greater weight of a lead base enamel is necessary than the amount of enamel needed when a non-lead base enamel is used.

We have discovered a new series of glasses referred to as potassium-fluorine glasses. Many of these glasses have fusion temperatures below 600° C. and, among other useful properties, possess the valuable property of forming excellent enamel coatings on aluminum and aluminum alloy surfaces.

The glasses of our present invention may be considered essentially as comprising a five component system expressed as $F—K_2O—SiO_2—Al_2O_3—B_2O_3$. However, five component systems are exceedingly difficult to illustrate. In order to illustrate the invention more easily, a four component system is used, $SiO_2—Al_2O_3—B_2O_3—K_2SiF_6$. This can be represented by a tetrahedron in which, for convenience, $K_2SiF_6$ is placed at an apex. By representing the system in this manner the effect of varying the $Al_2O_3$, $B_2O_3$ and $SiO_2$ can be further illustrated by fixing the amount of $K_2SiF_6$ and illustrating the system by a triangle in which only the amounts of $Al_2O_3$, $B_2O_3$ and $SiO_2$ are varied. For an exact presentation, a new triangle would have to be used for each change in $K_2SiF_6$ content. This method of description has the disadvantage of fixing the ratio of the fluorine to potassium and only partially showing the effect of varying the amounts of these materials. However, it does illustrate the large number of glasses which can be formed as well as the general effect of varying the amounts of added $SiO_2$, $Al_2O_3$ and $B_2O_3$ and the limits of these materials. The figures in the drawings are based on this system of illustration.

Figure 1a is a tetrahedron representing the four component system $K_2SiF_6$, $SiO_2$, $B_2O_3$ and $Al_2O_3$ with the 30% $K_2SiF_6$, 50% $K_2SiF_6$, and 70% $K_2SiF_6$ planes being indicated.

Figure 2a is a tetrahedron representing the four component system $K_2SiF_6$, $SiO_2$, $Al_2O_3$, $B_2O_3$, the 50% $K_2SiF_6$ plane being indicated.

Figures 4a, 4b, and 4c are graphs pictorially representing the broad limits respectively of $Al_2O_3$, $SiO_2$, and $B_2O_3$ as related to fluorine content in the glasses of the present invention.

Figures 5a, 5b, and 5c are graphs pictorially representing the preferred limits respectively of $Al_2O_3$, $SiO_2$, and $B_2O_3$ as related to fluorine content in the glasses of the present invention.

Figure 1:
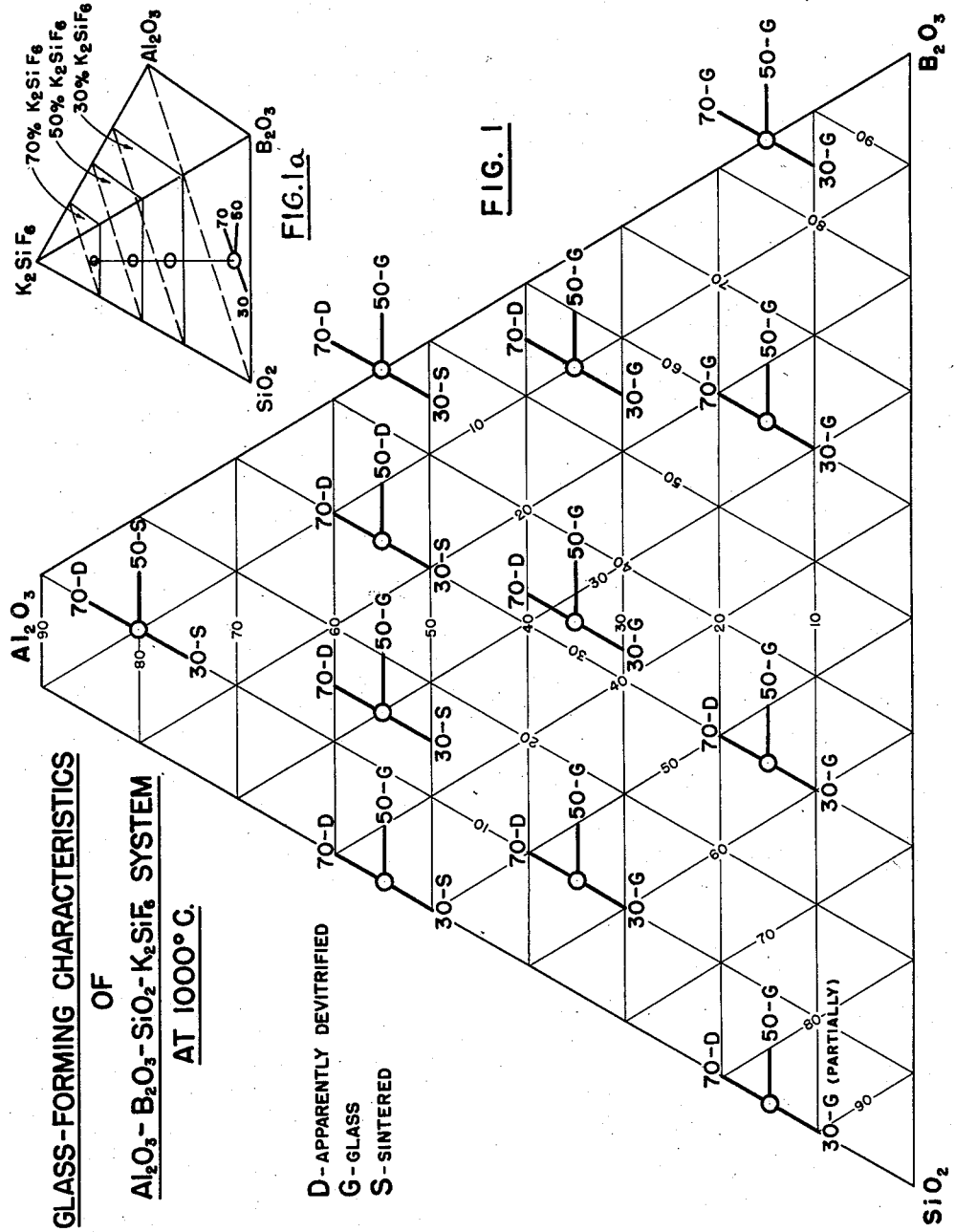
Fig. 1 is a graph representing the 30% $K_2SiF_6$, 50% $K_2SiF_6$, and 70% $K_2SiF_6$ planes of Fig. 1a showing the glass forming characteristics of various compositions indicated by the points on the graph.
Figure 2:
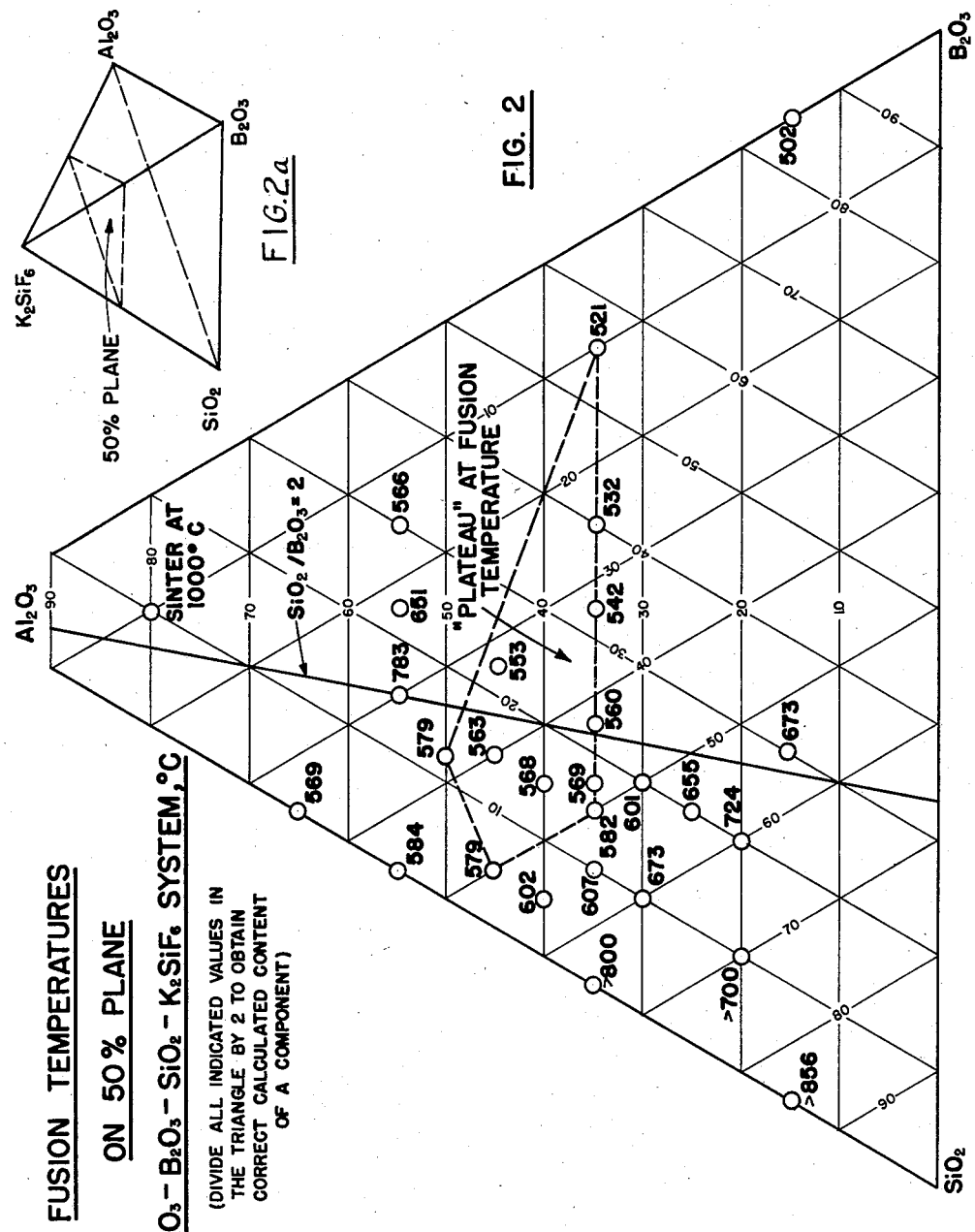
Figure 2 is a graph representing the 50% $K_2SiF_6$ plane of Figure 2a showing the fusion temperatures of the various compositions indicated by the points on the graph. The purpose of Figure 2 is primarily to illustrate the effects of the ingredients $Al_2O_3$, $SiO_2$ and $B_2O_3$ on fusion temperature.

Referring to the drawings Figures 1 and 2, a ceramic chemist will readily note that the points noted in the graphs give actual compositions.

Referring to Figure 1 each point noted gives three compositions, one for 70% $K_2SiF_6$, one for 50% $K_2SiF_6$, and one for 30% $K_2SiF_6$, the 70, 50 and 30 of the point representing the 70% $K_2SiF_6$ plane, the 50% $K_2SiF_6$ plane, and the 30% $K_2SiF_6$ plane as illustrated by the perspective view of Figure 1a which gives the key for the systems used. Taking, for example, the point

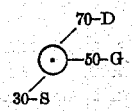

in the middle of the graph of Fig. 1, this represents the following three different compositions:

|  | 70% $K_2SiF_6$ plane | 50% $K_2SiF_6$ plane | 30% $K_2SiF_6$ plane |
|---|---|---|---|
|  | Percent | Percent | Percent |
| $K_2SiF_6$ | 70.0 | 50.0 | 30.0 |
| $Al_2O_3$ | 16.5 | 27.5 | 38.5 |
| $SiO_2$ | 9.0 | 15.0 | 21.0 |
| $B_2O_3$ | 4.5 | 7.5 | 10.5 |
|  | 100.0 | 100.0 | 100.0 |
| Observation | devitrified | glass | sintered |

These composition are read directly from the graph of Figure 1. Since by nature of the graph, the percents of $Al_2O_3$, $SiO_2$, and $B_2O_3$ must add up to 100% in order to get the correct amounts of these oxides, in the composition where 70% of the composition is $K_2SiF_6$ the remainder of the composition is obtained by multiplying the values read for $Al_2O_3$, $SiO_2$, and $B_2O_3$ by 30%. When $K_2SiF_6$ is 50% these values will be multiplied by 50% and where the $K_2SiF_6$ content is 30% these values will be multiplied by 70% to get the amounts of $Al_2O_3$, $SiO_2$ and $B_2O_3$ in the composition. The graph of Figure 1 thus gives actual compositions and indicates whether these compositions formed a glass (G), a devitrified material (D), or a sintered material (S).

Referring to Figure 2 illustrating the 50% $K_2SiF_6$ plane, the points indicated are actual glass compositions, determined as in the same manner as for the 50% $K_2SiF_6$ plane of Figure 1, for which the fusion temperatures are given.

The glasses, which form the subject matter of our present invention, are prepared from batches which will yield, on a calculated weight basis of 100 parts glass composition, a glass containing about 14 to 32 parts of fluorine and 12 to 26 parts of $K_2O$ in a weight ratio of 1.0 to 1.4 parts fluorine per part $K_2O$, together with approximately 7 to 66 parts $SiO_2$, 0 to 33 parts $Al_2O_3$ and 0 to 66 parts $B_2O_3$. All values are given on a weight basis, it being understood that wherever parts, percents or ratio are referred to throughout the specification and claims these are on a weight basis and not on a mol or volume basis.

It is immediately apparent on studing the projection of the tetrahedron of Figure 1 that the limits with respect to the amounts of $Al_2O_3$, $B_2O_3$ and $SiO_2$ present in the glass composition are dependent on the amount of potassium and fluorine also present, a considerably larger variation with respect to the $Al_2O_3$, $B_2O_3$ and $SiO_2$ being permissible when the total calculated fluorine content of the glass is approximately 23%, which it is for 50% $K_2SiF_6$, than when it is either 14% or 32%, which are the fluorine contents respectively when 30% $K_2SiF_6$ and 70% $K_2SiF_6$ are employed. The limits both in the specification and claims should, therefore, be read with this in mind.

This relationship between the amounts of $Al_2O_3$, $SiO_2$, and $B_2O_3$ to the fluorine content of the glass is illustrated in a somewhat different manner by Figures 4a, 4b, 4c and Figures 5a, 5b and 5c, the figures of set 4 indicating the broad limits of the glasses claimed and the figures of 5 indicating the preferred limits of the glasses claimed. It will be noted, that even though the glasses may contain no $Al_2O_3$ or no $B_2O_3$ in the broad limits of the composition, they must contain one or the other and preferably both.

It will also be noted that the fluorine to potassium ratio is indicated in the legend on the drawings.

These figures thus help to illustrate the boundaries of the glasses of the present invention rather than giving specific compositions as do Figures 1 and 2.

Though the glasses and enamels of our present invention all contain, on a calculated basis, fluorine, $K_2O$, $SiO_2$, $Al_2O_3$ and $B_2O_3$ in amounts in the ranges above specified, this does not mean that the glasses are limited to these ingredients alone. This is clearly illustrated by glasses of the following table which lists some of our glass compositions together with their fusion temperatures. The calculated glass compositions are given on a weight basis. The fusion temperatures were obtained by the fusion block method (A. L. Andrews, "Enamels," p. 331, The Twin City Printing Co., Champaign, Illinois, 1935).

|  | 1 | 2 | 3 | 4 | 5 | 6 | 7 | 8 |
|---|---|---|---|---|---|---|---|---|
| F | 24.2 | 23.0 | 23.0 | 21.2 | 23.6 | 22.2 | 23.4 | 18.9 |
| $K_2O$ | 17.3 | 17.4 | 19.0 | 17.5 | 18.8 | 21.2 | 19.3 | 13.8 |
| $Al_2O_3$ | 14.2 | 14.3 | 15.8 | 18.4 | 14.0 | 19.3 | 15.8 | 16.1 |
| $SiO_2$ | 33.3 | 33.4 | 34.6 | 27.6 | 18.9 | 28.8 | 30.3 | 34.2 |
| $B_2O_3$ | 4.0 | 4.1 | 4.5 | 6.2 | 20.6 | 6.4 | 6.8 | 4.6 |
| ZnO | 7.1 |  |  |  |  |  |  |  |
| BaO |  | 7.9 |  |  |  |  |  |  |
| $TiO_2$ |  |  | 3.0 |  |  |  |  |  |
| $P_2O_5$ |  |  |  | 9.1 |  |  |  |  |
| PbO |  |  |  |  |  | 4.1 |  | 12.6 |
| Cl |  |  |  |  |  |  | 2.1 |  |
| $Sb_2O_3$ |  |  |  |  |  |  | 4.5 |  |
| Fusion Temp., °C | 640 | 730 | 580 | 660 | 510 | 550 | 570 | 580 |

Our preferred glasses are those having relatively low fusion temperatures and from which we would generally prepare our enamel frits. These preferred glasses generally contain on a calculated oxide basis 17 to 23% $K_2O$, 11 to 38% $SiO_2$, 5 to 33% $Al_2O_3$, 2 to 43% $B_2O_3$ and 21 to 28% fluorine, the weight ratio of fluorine to potassium oxide being within the range of about 1.0 to 1.4. In calculating these percentages from the batch ingredients employed, we prefer to use the following method.

Assuming a batch composition, silica ($SiO_2$) 6.0%, alumina hydrate ($Al_2O_3 \cdot 3H_2O$) 19.0%, boric acid ($H_3BO_3$) 32.1% and potassium fluosilicate ($K_2SiF_6$) 42.9%, the calculation is made by using the oxide equivalents of the potassium fluosilicate ($K_2SiF_6$). By this method of calculation, the glass would be described as one having a calculated oxide content of $SiO_2$ 19.9%, $Al_2O_3$ 14.0%, $B_2O_3$ 20.4%, $K_2O$ 20.7% and F 25.1%. This is the method of calculation used for the herein described limits and for the glass compositions given in the above table. The method is that usually used in describing glasses.

It should be pointed out, however, that other methods of calculation could be used and somewhat different results obtained. It is, therefore, important, in considering the limits as set forth in the specification and claims, that it be understood that these limits are based on the oxide method of calculation as illustrated.

If the calculations are made by first assuming that the $K_2SiF_6$, of the above batch, is present in the final glass as KF and $SiF_4$, the final calculated $SiO_2$ content and calculated fluoride content of the glass would be somewhat different than that obtained by using as a basis for calculation, oxide equivalent of the $K_2SiF_6$. This is readily illustrated by the following example: Using the same batch ingredients but assuming the $K_2SiF_6$ to be present in the final glass as KF and $SiF_4$, the glass on a calculated basis would contain $SiO_2$ 7.6%, $Al_2O_3$ 15.6%, $B_2O_3$ 22.8%, $SiF_4$ 25.5% and KF 28.5%. The glass, by this method of calculation, would have a fluorine content of 28.0% and a $SiO_2$ content of 7.6% as compared to the fluorine content of 25.1% and the $SiO_2$ content of 19.9% as obtained by the first described method of calculation.

The vitreous enamel coats on aluminum prepared by using frits of glasses as above described, particularly those within the preferred range, have good adherence to aluminum and aluminum base alloys and show excellent resistance to abrasion, impact and bending. The enamels of the present invention also possess considerably greater chemical resistance, particularly to alkalis, than the unprotected aluminum or aluminum base metal to which they are applied.

In making the glasses used for preparing the diagrams in the drawings and used for illustration in the tables and examples of the present invention, the powdered batch ingredients were weighed out, thoroughly mixed and then placed in clay or kyanite crucibles. The crucibles were then placed in a furnace in which the temperature was about 1000° C. Though generally a clear liquid was formed in about 30 minutes, the crucibles were usually left in the furnace for about one hour. After this time they were removed and permitted to cool gradually if a glass was desired, or the molten contents of the crucible were cooled rapidly by pouring into water if a frit was desired. The clay or kyanite crucibles showed substantially no signs of damage after firing which is surprising in view of the high fluorine content of the glasses prepared. This is probably due to the formation of a protective coating during the preparation of the melt which protects the inner surface of the crucible from the main body of the melt.

One interesting aspect noted with respect to the system of glasses of our present invention is that the ratio of the $SiO_2$, added as $SiO_2$ to the batch ingredients, to the $B_2O_3$, on a calculated basis, has an important effect on the fusion temperature of the final glass as well as on its resistance to chemical attack.

Figure 3:
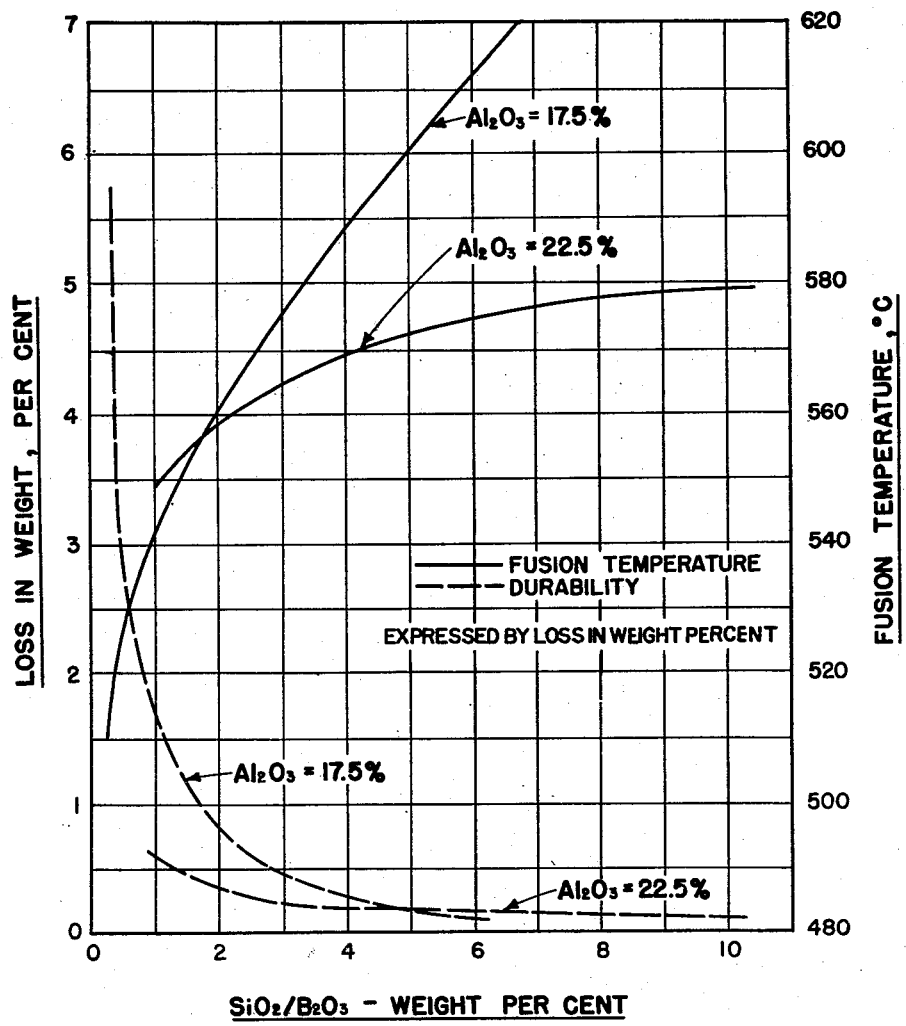
Figure 3 is a graph illustrating the effect of the ratio of $SiO_2$ added as such to the calculated $B_2O_3$ on the fusion temperature and durability of glasses. This is done by selecting glasses of two different $Al_2O_3$ contents on the 50% $K_2SiF_6$ plane of Figure 1 and varying the $SiO_2$ and $B_2O_3$ content of these glasses.

For example, as this ratio increases, the fusion temperature of the glass tends to increase and as the ratio decreases the fusion temperature of the glass tends to decrease. However, since the durability of the glasses tends to decrease as the $SiO_2/B_2O_3$ ratio decreases, it is preferred to work with glasses having a $SiO_2/B_2O_3$ ratio of at least 1 (the $SiO_2$ being that added as such and not the total calculated $SiO_2$ of the glass). The effect of variation of this ratio on the fusion temperature and durability of glasses of the system $Al_2O_3$—$B_2O_3$—$SiO_2$—$K_2SiF_6$, where the $Al_2O_3$ is held to 17.5% and 22.5%, respectively, and the $K_2SiF_6$ is held to 50%, is illustrated in Figure 3 of the drawings.

Though in Figure 1, the fluorine and potassium content of the glasses are represented as being obtained through the use of $K_2SiF_6$, the fluorine and potassium are not limited to this fixed weight ratio of 1.5, $$\left(\frac{6F}{2K} = \frac{6 \times 19}{2 \times 39.1} = 1.46\right)$$

but may vary from 1.2 to 1.7 parts fluorine per part potassium (equivalent to a weight ratio of 1.0 to 1.4 parts fluorine per part potassium oxide). Also, the potassium and fluorine may be added to the glass by substituting in place of the $K_2SiF_6$, either in whole or in part, various raw materials such as $KBF_4$, $KF$, $K_2AlF_5$, etc., as long as the potassium and fluorine-containing additions are added in such amounts as to keep the desired fluorine to potassium ratio and the calculated oxides in the ranges disclosed.

In making the glasses of our present invention, we generally prefer to use in the batch ingredients $K_2SiF_6$ for introducing the fluorine and $K_2O$; $K_2SiF_6$ and $SiO_2$ for introducing the $SiO_2$; $Al_2O_3.3H_2O$ and $Al_2O_3$ for introducing the $Al_2O_3$; and $H_3BO_3$ for introducing the $B_2O_3$. However, in the formation of glasses, once the glass composition has been determined, it is common to use various materials in the batch to introduce the desired elements into the glass; thus, any of the following could be used in the batch from which the glass is prepared if added in the proper amounts to give in the final glass the calculated fluorine and oxide contents specified and to give the potassium and fluorine in the required ratio:

Flourine—$K_2SiF_6$, $KBF_4$, $K_2AlF_5$, $KF$, $KHF_2$
Potassium oxide—$K_2CO_3$, $K_2SiO_3$, as well as those compounds given for fluorine
$Al_2O_3$—$Al_2O_3$, $Al_2O_3.3H_2O$, $K_2O.Al_2O_3.6SiO_2$ (feldspar), $Al_2O_3.2SiO_2.2H_2O$ ("clay")
$SiO_2$—Sand, $K_2SiO_3$, $K_2O.Al_2O_3.6SiO_2$ (feldspar), clay
$B_2O_3$—$H_3BO_3$, $B_2O_3$, $K_2B_4O_7$ In order to better illustrate our invention, the following examples of glasses and the preparation thereof are given. These examples, however, are given for the purpose of illustration only and should not be interpreted as limiting the invention to the specific examples employed since it is obvious that one skilled in the art, after reading the disclosure, could prepare many other specific formulations differing from those set forth in the specific examples, and yet coming within the spirit and teaching of our invention.

EXAMPLE 1

The following calculated glass composition was prepared from the batch composition also set forth:

*Calculated glass composition*

| Component: | Weight percent |
|---|---|
| $Al_2O_3$ | 14.0 |
| $B_2O_3$ | 20.4 |
| $SiO_2$ | 19.9 |
| $K_2O$ | 20.7 |
| F | 25.1 |
| | 100.1 |

*Batch composition*

| Component: | Weight percent |
|---|---|
| Alumina hydrate, $Al_2O_3.3H_2O$ | 19.0 |
| Boric acid, $H_3BO_3$ | 32.1 |
| Silica, $SiO_2$ | 6.0 |
| Potassium fluosilicate, $K_2SiF_6$ | 42.9 |
| | 100.0 |

The materials used in making up the batch were C. P. alumina hydrate, C. P. boric acid, powdered flint and a commercial grade potassium fluosilicate (minimum 97% $K_2SiF_6$). The batch ingredients were thoroughly mixed and placed in an open fire-clay crucible. The open crucible with its contents was then placed in a furnace at a temperature of between 980° and 1000° C. An hour later the molten glass was ready for fritting, which was done by pouring the molten material into cool water which was stirred during the process. The frit was then separated from the water, air-dried over-night at room temperature, and then finally dried at a temperature of 140 to 150° C.

EXAMPLE 2

The following calculated glass composition was prepared from the batch composition given, in a manner similar to that set forth in Example 1:

*Calculated glass composition*

| Component: | Weight percent |
|---|---|
| $Al_2O_3$ | 13.9 |
| $B_2O_3$ | 20.6 |
| $SiO_2$ | 20.0 |
| $K_2O$ | 20.6 |
| F | 24.9 |
| | 100.0 |

*Batch composition*

| Component: | Weight percent |
|---|---|
| Alumina hydrate, $Al_2O_3.3H_2O$ | 20.0 |
| Boric acid, $H_3BO_3$ | 15.2 |
| Silica, $SiO_2$ | 18.8 |
| Potassium fluoborate, $KBF_4$ | 38.8 |
| Potassium carbonate, $K_2CO_3$ | 7.2 |
| | 100.0 |

The same raw materials were used as described in Example 1 with the exception of the potassium fluoborate which was a commercial grade material and the potassium carbonate which was of C. P. grade.

EXAMPLE 3

The glass composition of this example was obtained by replacing 5% by weight of $Al_2O_3$ by $Sb_2O_3$. The calculated glass composition and the batch composition from which it was obtained are as follows:

*Calculated glass composition*

| Component: | Weight percent |
|---|---|
| $Al_2O_3$ | 15.8 |
| $B_2O_3$ | 6.8 |
| $SiO_2$ | 30.3 |
| $K_2O$ | 19.2 |
| F | 23.4 |
| $Sb_2O_3$ | 4.5 |
| | 100.0 |

*Batch composition*

| Component: | Weight percent |
|---|---|
| Alumina hydrate, $Al_2O_3.3H_2O$ | 23.3 |
| Boric acid, $H_3BO_3$ | 11.6 |
| Silica, $SiO_2$ | 17.4 |
| Potassium fluosilicate, $K_2SiF_6$ | 43.4 |
| Antimony trioxide, $Sb_2O_3$ | 4.3 |
| | 100.0 |

The glass was prepared in substantially the same manner as illustrated in Example 1.

EXAMPLE 4

This example illustrates a still further manner of varying the final glass which consists in adding other ingredients to the glass composition after it has been formed and thereafter remelting the mixture. The following calculated glass composition was obtained by adding 5 parts by weight of aluminum fluoride to 95 parts by weight of a glass having the calculated composition of A. The final glass had the calculated composition of B.

*Calculated glass composition*

| | A | B |
|---|---|---|
| Alumina, $Al_2O_3$ | 17.5 | 16.6 |
| Boric Oxide, $B_2O_3$ | 5.0 | 4.8 |
| Silica | 27.5 | 26.1 |
| Potassium Fluosilicate, $K_2SiF_6$ | 50.0 | 47.5 |
| Aluminum fluoride, $AlF_3$ | | 5.0 |
| | 100.0 | 100.0 |

For convenience, the second method of calculation heretofore set forth is used. This is the method in which the potassium fluosilicate is considered as KF and $SiF_4$.

We have discovered that the adherence of the enamels of our invention to aluminum is dependent in part on the method employed in enameling the aluminum. Though enamel surfaces have been obtained by dusting a dry frit on the surface to be enameled and then firing, we have found that better adherence of the enamel coating to the aluminum surface can be obtained if a slip of the frit in water is first prepared and this slip then applied, for example, by spraying, and thereafter fired. Though better adherence of the enamel is obtained by first preparing a slip, the resistance of the enamel coating to chemical attack thus obtained is inferior to the resistance of enamels prepared by dusting the dry frit onto the aluminum surface and then firing. In order to obtain the particular advantages offered by each of these procedures, we prefer to first prepare an enameled surface on the aluminum article by spraying or otherwise coating with a slip of the glass used, firing, and thereafter dusting the enameled surface with a dry powder frit of the glass and again firing. By this procedure excellent adherence is obtained without detracting from the durability of the final enamel surface. This process is better illustrated by the following example which is given for purposes of illustration only and should not be considered as limiting the invention to the specific example employed.

EXAMPLE 5

An aluminum panel was first cleaned by immersion for five minutes in a phosphoric acid type cleaner. Other cleaners which would satisfactorily remove organic material and dirt could be used in place of the phophoric acid cleaner if desired. The cleaned panel was rinsed with water, air dried, then dried in an oven at about 90° C., and thereafter allowed to cool in air.

A slip was prepared from a frit of the glass composition of Example 1 by placing in a porcelain ball mill 42 parts by weight frit, 1 part by weight of an enameling clay, and 57 parts by weight water. The mixture was milled until less than 6% of the solids were retained on a 200 mesh screen. This slip was sprayed onto the cleaned panel with a conventional spray gun at a gauge pressure of about 30 pounds per square inch. Best results were obtained when the coating had a wet weight of about 18 to 20 gms. per square foot which corresponds to a fired weight of about 11 to 15 gms. per square foot. The slip-coated panel was air dried for a short time and thereafter fired at 530 to 550° C. for three to five minutes. The fired panel was then removed from the furnace and "dusted" with a cover-coat formed from Glass 5 of the table of glasses heretofore given. The dusting was done through an 80 mesh screen, the dusted coat weighing approximately 12 gms. per square foot. The panel was then fired again for approximately three minutes at a temperature of 530 to 550° C. Two additional "dusted" cover-coats were applied in the same manner. The temperature of firing for both the slip and the dust coat are, of course, dependent upon the fusion temperature of the glass used.

The dust coat was prepared from glass 5 by first preparing a frit as described in Example 1 and thereafter milling the frit until it screened through a 65 mesh sieve.

Glasses of our present invention, though primarily suited for enameling, may have numerous other uses. For example, we have found that some of these glasses make excellent fillers and bonding materials for use in abrasive wheels, are suitable as opal glasses and form the basis for low fusion pottery glazes, tile glazes, etc.

The glasses and frits of our present invention are new products of manufacture as are also the aluminum articles whose surfaces have been enameled through the use of frits prepared from the glasses disclosed.

In describing the invention, certain specific forms have been used. However, the invention may be embodied in any specific form which would be apparent to one skilled in the art without departing from the spirit and essential features of the invention. The specific examples and descriptions employed, therefore, should be considered as illustrative and not restrictive in interpreting the invention, and the invention should not be limited to the specific examples employed.

Having thus described our invention, we claim:

1. A glass composition consisting essentially of, on a calculated oxide basis, fluorine and compatible metal oxides including $K_2O$, $SiO_2$, and at least one material of the group consisting of $Al_2O_3$ and $B_2O_3$ in which the fluorine to $K_2O$ ratio is within the range of from 1.0 to 1.4, in which the calculated percent by weight of fluorine is 14% to 32% and that of $K_2O$ is 12% to 26%, and in which the percent by weight of $Al_2O_3$, $SiO_2$ and $B_2O_3$ with respect to fluorine is within the limits defined by the areas labeled "glass formation" in the graphs shown in Figures 4a, 4b and 4c respectively of the drawings.

2. A glass composition consisting essentially of, on a calculated oxide basis, fluorine and compatible metal oxides including $K_2O$, $Al_2O_3$, $SiO_2$ and $B_2O_3$ in which the fluorine to $K_2O$ ratio is within the range of from 1.0 to 1.4, in which the calculated percent by weight of fluorine is 21% to 28% and that of $K_2O$ is 17% to 23%, and in which the percent by weight of $Al_2O_3$, $SiO_2$ and $B_2O_3$ with respect to fluorine is within the limits defined by the areas labeled "glass formation" in the graphs shown in Figures 5a, 5b and 5c respectively of the drawings.

3. A glass composition of claim 2 prepared by fusing a batch of which at least 90% consists of the materials potassium fluosilicate, silicon dioxide, a material of the group consisting of boric acid and boric oxide and material of the group consisting of aluminum hydroxide and aluminum oxide, said materials being used in the calculated amounts necessary to give the percentage compositions of claim 2.

4. The glass composition of claim 2 which was prepared by adding at least part of the calculated $SiO_2$ as $SiO_2$ in the batch igredients used in preparing the glass and in which the ratio of said added $SiO_2$ to said calculated $B_2O_3$ is at least 1.

5. An enamel frit for enameling aluminum and aluminum alloy surfaces prepared from the glass composition of claim 2.

6. As a new article of manufacture an aluminum surface having a closely adherent enamel coating thereon comprising a glass composition as defined in claim 1.

7. A glass composition consisting essentially of, on a calculated oxide basis, 21 to 28% fluorine, 17 to 23% $K_2O$, 11 to 38% $SiO_2$, 5 to 33% $Al_2O_3$ and 2 to 43% $B_2O_3$ in which the calculated fluorine and $K_2O$ are present in the relative amounts of 1.0 to 1.4 parts fluorine per part of $K_2O$.

References Cited in the file of this patent
UNITED STATES PATENTS

| | | |
|---|---|---|
| 38,286 | Cobley | Apr. 28, 1863 |
| 1,230,958 | Warga | June 26, 1917 |
| 2,165,554 | Kreidl | July 11, 1939 |
| 2,229,524 | Rosenberg | Jan. 21, 1941 |
| 2,247,196 | Goodwin | June 24, 1941 |
| 2,330,129 | Lucas | Sept. 21, 1943 |
| 2,475,469 | Bennett | July 5, 1949 |
| 2,495,837 | Porter | Jan. 31, 1950 |

FOREIGN PATENTS

| | | |
|---|---|---|
| 138,023 | Austria | 1934 |
| 638,710 | Germany | 1936 |
| 603,623 | Great Britain | June 18, 1948 |